Patented Feb. 22, 1938

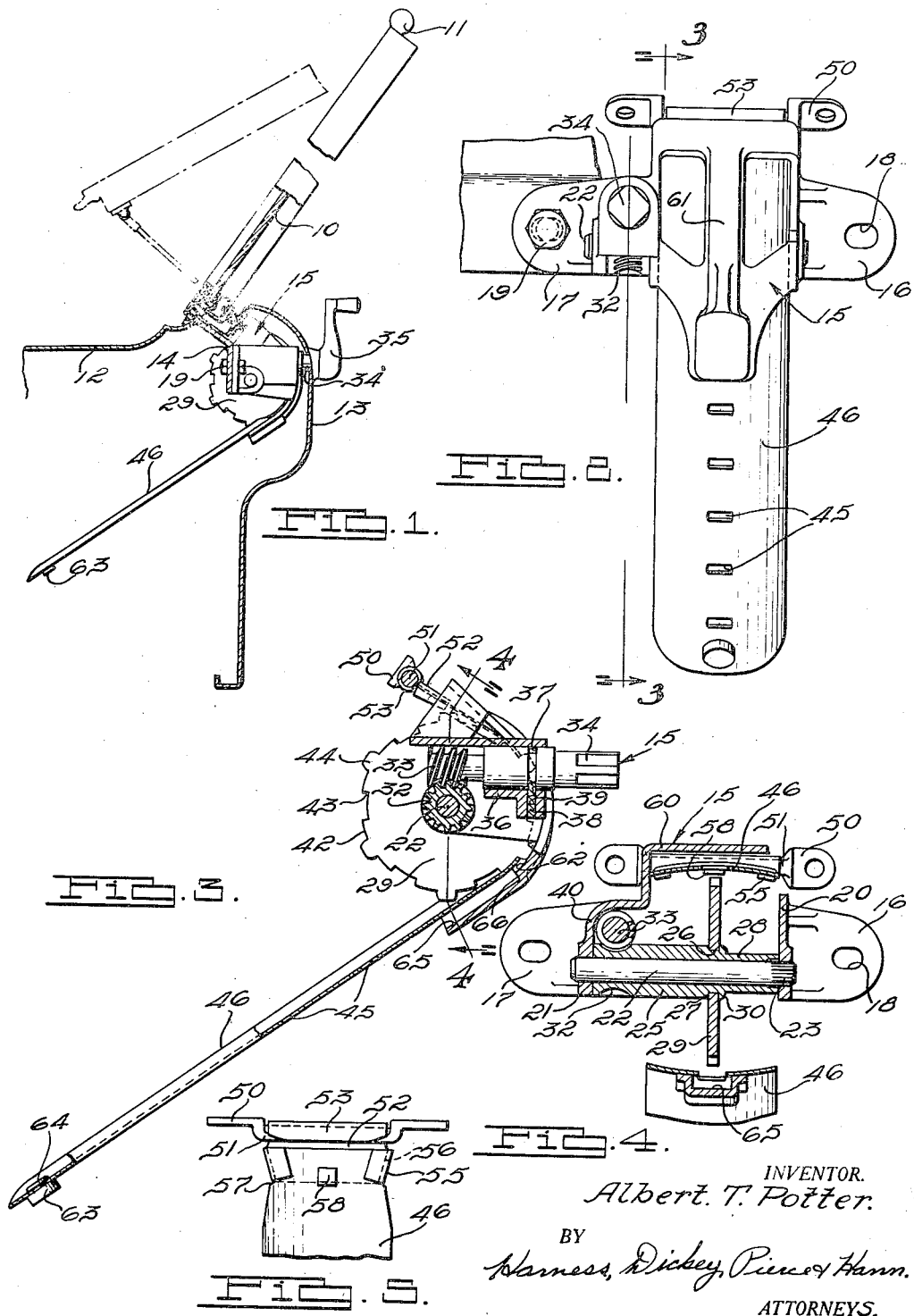

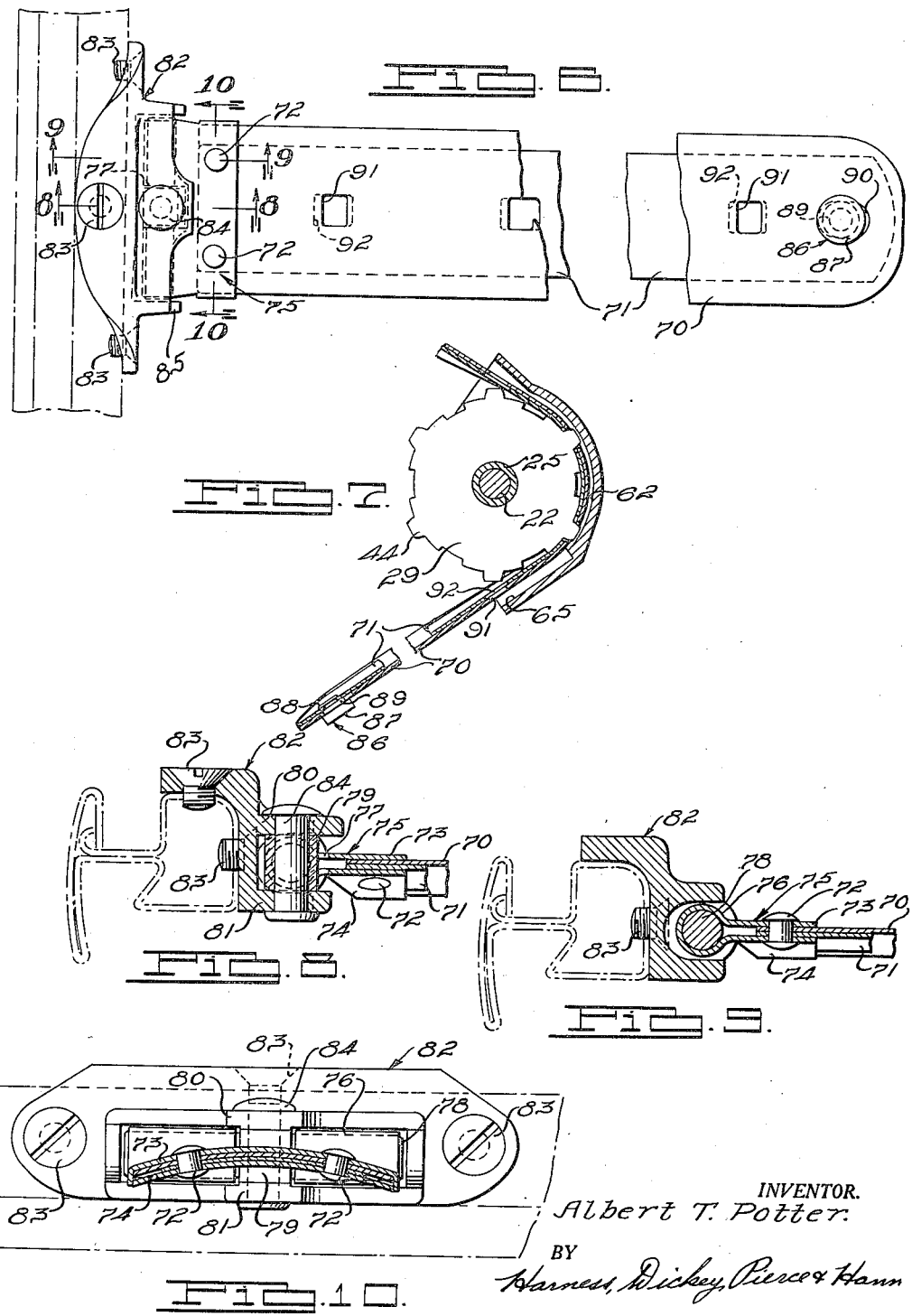

2,109,257

UNITED STATES PATENT OFFICE 2,109,257

WINDSHIELD OPERATING DEVICE

Albert T. Potter, Detroit, Mich., assignor to Ainsworth Manufacturing Corporation, a corporation of Michigan Application November 26, 1934, Serial No. 754,742

9 Claims. (Cl. 296—84)

The invention relates to closure operating devices and it has particular relation to a windshield operating device for use on automobiles.

In general, the invention is similar to that disclosed in my co-pending application for patent relating to windshield operating devices, Serial No. 697,381, filed November 10, 1933. In that application for patent a windshield operating device is disclosed which includes a transversely bowed steel tape secured at one end to the edge of the windshield and which is adapted to pass around a sprocket wheel and project forwardly at its other end under the cowl of the automobile. For moving the tape, longitudinally spaced openings are provided therein which engage the teeth of the sprocket wheel and when the wheel is turned the tape either thrusts the windshield open or pulls it toward its closed position depending upon the direction of rotation of the wheel. The wheel is turned by a worm and worm wheel connecting the sprocket wheel and a short operating shaft that projects rearwardly through the instrument panel, and rearwardly of the panel a handle is mounted on the operating shaft.

The present invention constitutes an improvement over that disclosed in the co-pending application for patent and one object thereof is to provide a simpler and less expensive windshield operating device which is durable and efficient in operation.

Another object of the invention is to provide an improved means for limiting movement of the tape in thrusting the windshield open so as to limit opening movement of the windshield.

Another object of the invention is to provide an improved means for connecting the end of the tape to the windshield.

Another object of the invention is to provide an improved mechanism including a tape structure which is more rigid in a linear direction, while still enabling bending of the tape in operation of the mechanism without requiring an undesirable effort.

Other objects of the invention will become apparent from the following specification, the drawings relating thereto, and from the claims hereinafter set forth.

For a better understanding of the invention reference may be had to the drawings, wherein:

Figure 1 is a fragmentary and cross-sectional view of an automobile body illustrating a windshield and a mechanism for moving it to closed and open positions as constructed according to one form of the invention.

Fig. 2 is an enlarged elevational view of the mechanism shown by Fig. 1 as seen from the rear side of the latter with the instrument panel removed.

Fig. 3 is a cross-sectional view taken substantially along the line 3—3 of Fig. 2.

Fig. 4 is a cross-sectional view taken substantially along the line 4—4 of Fig. 3.

Fig. 5 is a detail view illustrating the connection between the tape and windshield.

Fig. 6 is a plan view, partly broken, showing an improved tape construction and improved means connecting it to the windshield.

Fig. 7 is a side view illustrating a mechanism such as shown by Fig. 3, with the tape shown by Fig. 6.

Fig. 8 is a cross-sectional view on a larger scale, taken substantially along the line 8—8 of Fig. 6.

Fig. 9 is a cross-sectional view on a larger scale, taken substantially along the line 9—9 of Fig. 6.

Fig. 10 is a cross-sectional view on a larger scale, taken substantially along line 10—10 of Fig. 6.

Referring to Fig. 1, the windshield is indicated at 10 and is hingedly connected to the upper part of the automobile as indicated at 11. The cowl portion of the automobile is indicated at 12 and an instrument panel 13 extends downwardly from the rear portion of the cowl and may be secured in place in various ways such as by connecting it to the rear edge of the cowl. A strip 14 projects downwardly under the rear edge of the cowl and forwardly of the instrument panel 13 and may be secured to the rear portion of the cowl such as by spot welding. This plate serves as a support for the windshield operating mechanism to be described.

As shown best by Fig. 2, the operating device includes a one-piece housing 15 which terminates at its lateral edges in lips 16 and 17 that are provided with laterally elongated openings 18 through which bolts 19 may project for securing the housing to the strip 14. The openings 18 are desired so as to compensate for any variations in location of the bolt-receiving openings in the strip 14. As shown best by Fig. 4, spaced side walls 20 and 21 are provided on the housing and these walls have openings for receiving a pin 22 that preferably is fixed in position by providing serrations 23 on one end of the pin and then driving the pin through the openings in such manner that the serrations positively bind the end of the pin in the aperture provided in the wall 20. A tubular shaft 25 is rotatably mounted on the pin 22 and this shaft is provided with a short portion 26 of slightly reduced diameter thereby providing a shoulder 27 and a portion 28 which is smaller in diameter than the portion 26. A sprocket wheel 29 having an opening in its center substantially corresponding in diameter to the portion 26 is mounted on the shaft 25 and is slipped over the portion 26 of the shaft until it is seated against the shoulder 27 and then the other end of the portion 26 is swaged axially over the side of the sprocket wheel as indicated at 30 so as to firmly lock the wheel in axial position. It may be mentioned that the sprocket wheel will have a tight fit on the portion 26 and this fit in conjunction with the binding engagement of the swaged over portion 30 and shoulder 27 with the sprocket wheel lock the wheel and tape together for rotation.

The larger end of the shaft 25 is provided with worm teeth 32 that mesh with a worm 33 which, as best shown by Fig. 3, projects rearwardly through the housing and terminates in a polygonal end 34 adapted for receiving an operating handle indicated at 35 in Fig. 1. The central portion of the worm shaft is journaled in an elongated tubular portion 36 of the housing and for preventing axial movement of the worm shaft, the latter is provided with an annular groove 37 and a locking plate 38 is pressed upwardly through a slot 39 in an offset part of the tubular portion 36 and engages the groove. After the plate 38 is disposed in the slot 39, the slot may be closed slightly at its outer end so as to maintain the plate in position and in engagement with the groove 37. It will be noted that the portion of the housing receiving the worm shaft 33 is curved around the worm portion as indicated at 40 in Fig. 4 and this arrangement in conjunction with the tubular portion 36 serves to provide a positive guide for the worm shaft during its rotation and maintains the worm in engagement with the teeth 32 on the shaft 25.

The sprocket wheel 29 is provided with circumferentially spaced rim portions 42 separated by notches 43 and intermediate the circumferential ends of the portions 42, radial teeth 44 are provided. These teeth are adapted to engage longitudinally spaced openings 45 in a steel tape 46 which is of transversely bowed character. Owing to its transverse curvature, the tape 46 has considerable linear rigidity and resists bending. The tape at its upper end is connected to the free edge of the windshield and for accomplishing this result a bracket element 50 is provided which has apertured ends through which screws or other means may be inserted and secured to the windshield frame. The bracket 50 intermediate its ends has a pin portion 51 and in fastening the end of the tape to the pin portion 51 a metal plate 52 is employed which has one end folded around the pin 51 as indicated at 53. This plate, as best shown by Fig. 5, extends longitudinally over the convex side of the tape and at opposite sides has downwardly and inwardly turned lips 55 that are folded over notched edges of the tape wherein the notches have tapered edges 56 and shoulders 57. At its center the plate 52 has a struck out lip 58 which projects through an opening in the end of the tape and this lip is bent over and against the underside of the tape towards the adjacent end thereof.

This arrangement insures a positive connection between the tape and the plate 52 as it will be appreciated that the folded-over lips 55 are so connected to the end of the tape that longitudinal separation of the plate and tape cannot occur either when the tape is used to thrust the windshield open or to pull it closed, while the lip 58 serves as a thrust and pull connection between the central part of the tape and plate.

The tape in its movement around the sprocket wheel is guided by a curved outer wall 60 of the housing and this wall at its center has a radially offset portion 61 which has an internal groove 62 for accommodating the teeth 44 of the sprocket wheel. During the bending of the tape around the sprocket wheel it naturally flattens and for this reason the wall 60 on opposite sides of the groove 62 is substantially cylindrical.

For limiting movement of the windshield and movement of the tape in this direction, the lower end of the latter is provided with a projecting head 63 on its convex side which is riveted to the tape thereby forming a head 64 on the concave side. The head 63 is adapted to move into an enlarged portion 65 of the groove 62 provided in the wall 60 and it will be noted that this portion of the wall at the lower side of the housing projects tangentially. When the windshield is opened a predetermined amount the head 63 engages a shoulder 66 at the inner end of the enlarged portion 65 of the groove, thereby limiting movement of the tape. The head 64 of the element 62 at the concave side of the tape is accommodated by one of the notches 43 when the projection 62 moves into the enlarged portion 65 of the groove so as not to cause any binding engagement of the head and the rim of the sprocket wheel.

When the device is mounted behind the instrument panel 15, the only visible portions thereof are the handle 35 for operating the device and the connection between the upper end of the tape and the windshield. The tape at its upper end passes through a slot provided in downwardly and forwardly projecting portions of the instrument panel and cowl 12 and from this it follows that the slot is actually concealed to occupants of the vehicle. When the windshield is opened the tape is deflected around the sprocket wheel and thrusts the windshield open and when it is closed the lower end of the tape is deflected around the sprocket wheel and then moves in a straight path under the cowl.

In the construction shown by Figs. 6 and 7, a double tape is employed comprising a wider tape 70 and a narrower tape 71, both of which have their concave surfaces at the same side so that the convex surface of the narrower tape substantially fits the concave surface of the wider tape. At one end the tapes are rigidly connected by rivets 72 which also secure legs 73 and 74 of a folded plate 75, against the inner and outer sides of the assembled tapes. The plate 75 has a cylindrical loop 76 beyond the end of the tapes, which is notched out at its center as indicated at 77, and at opposite sides of the notch, the loop receives rounded end portions of a pin 78. The central part of the pin is square shape as indicated at 79 and movably fits between upper and lower legs 80 and 81 of a bracket 82 which is secured to the windshield frame by screws 83. A vertical pin 84 projects through the central part of the legs 80 and 81 and rotatably through the square portion 79 of the pin 78, and it follows that the tapes, plate 75 and pin 78 may bodily turn in a plane parallel to the legs 80 and 81 of the bracket. It also is apparent that the tapes and plate 75 may pivot vertically about the rounded ends of the pin. Accordingly the connection between the end of the tapes and the windshield, is universal in character and this is desirable not only during normal opening and closing movement of the windshield, but also in the event the plane of the windshield should vary in use or in installing the shield. Occasionally one of the lower corners of the shield is moved inwardly or outwardly relatively to the other lower corner, and by providing the universal connection, no strain or binding of parts in the connection is encountered. Moreover the connection enables pulling the entire lower edge of the shield into tightly closed position without causing any transverse bodily movement tendencies in the tapes.

For closing the ends of the space between legs 80 and 81 of the bracket 82, ears 85 may be provided. These ears enhance the appearance of the connection and furthermore serve as reinforcing connections between the ends of the legs.

It may be noted that the edges of the narrower tape 71 are concealed by the overhanging and downwardly curving edges of the wider tape 70 and once the assembly is installed in an assembly such as shown by Fig. 1, the narrower tape is not seen unless viewed from underneath the tape.

The tapes are also connected at their opposite ends by a rivet element 86 similar to the rivet 63, which has a large head 87 on the outer side of tape 70 and a smaller head 88 on the inner side of tape 71. This rivet is tightly secured to tape 71 by means of head 88 and a shoulder head 89 engaging the convex side of the tape, but such shoulder head 89 is free to move longitudinally in an elongated opening 90 in tape 70. The head 87 is wider than this opening so as to hold the tapes together, but it will be apparent that relatively longitudinal movement of the tapes is permitted by the opening 90.

For engaging the teeth in the sprocket 29, the outer tape 70 is provided with openings 91 and the inner tape 71 is provided with openings 92 for allowing the teeth on the sprocket wheel to project therethrough, but the openings 92 are longer than openings 91 in order to insure that the teeth will exert pulling and pushing action on the outer and stronger tape by engaging the end edges of the openings 91.

The enlarged openings 92 in tape 71 and the elongated opening 90 in tape 70 permit slight longitudinal and relative movement of the tapes during operation of the mechanism and primarily this is desirable because such movement occurs when the tapes are bent around the sprocket wheel owing to the curvature of the bend in the tape 71 being of slightly smaller radius than that of the bend in the tape 70. In other words one tape slides slightly relative to the other when the tapes are bent or conversely, straightened after being bent.

The sprocket and casing assembly may be the same as shown by Figs. 1 to 4, although a slightly larger space must be provided between the periphery of the sprocket wheel and the wall 15 in order to accommodate both tapes. A slight variation in the size of the recesses 43 in the sprocket wheel or in the head 88 on the rivet element 86 may be necessary in order that when the windshield reaches its open position, the head 88 will be free to move into one of the recesses 43. In general the construction will operate the same, but manifestly the double tape will have greater linear rigidity and moreover the universal connection between the tape and windshield will relieve conditions caused by variations in the windshield and tape relation. Bending of the tape between the shield and sprocket wheel is thereby resisted more strongly and one tape could not bend without requiring a bend in the other. It will be appreciated that the curved portions of the tape around the sprocket wheel so engage each other and the casing and wheel, that a positive anchor for both bands is provided for holding the windshield against movement.

The construction illustrated provides a compact, although simple, operating device for windshields which can be manufactured inexpensively. It may be produced as an article of manufacture, ready for mounting on automobiles, and mounting of the device is effected very readily. During operation of the device, the steel tape is guided and bent around a portion of the sprocket wheel and approaches and moves away from the wheel in substantially tangential paths, and one end moves the windshield while the other end is projected forwardly under the cowl. The shape of the tape imparts linear rigidity thereto so that it may be used for opening and holding the windshield in open position, while readily allowing the tape to be bent around the wheel and towards its concave side although the tape as it bends around the wheel practically becomes transversely flat.

Although more than one form of the invention has been illustrated and described in detail, it will be apparent to those skilled in the art that various modifications may be made without departing from the scope of the appended claims.

I claim:

1. A device for operating windshields or the like comprising a wheel having circumferentially spaced teeth, a transversely bowed and normally straight steel tape having longitudinally spaced openings for engagement with said teeth and having one end adapted for connection with the windshield, a curved wall around a peripheral portion of the wheel for guiding and bending the tape around a portion of the wheel during linear movement of the tape while allowing the ends of the tape to move in paths that leave the wheel periphery, said wall having a circumferential groove in its internal surface for accommodating the teeth projecting through the openings in the tape, and means on the end of the tape opposite the end to be connected to the windshield for limiting windshield opening movement of the tape and comprising a projection which is too large to enter the end of the groove.

2. A device for operating windshields or the like comprising a wheel having circumferentially spaced teeth, a transversely bowed and normally straight steel tape having longitudinally spaced openings for engagement with said teeth and having one end adapted for connection with the windshield, a curved wall around a peripheral portion of the wheel for guiding and bending the tape around a portion of the wheel during linear movement of the tape while allowing the ends of the tape to move in paths that leave the wheel periphery, said wall having a circumferential groove in its internal surface for accommodating the teeth projecting through the openings in the tape, an element projecting through the end of the tape opposite the end to be connected to the windshield for limiting windshield opening movement of the tape and having heads on both sides of the latter wherein the head on the outer side of the tape is too large to enter the end of the groove, and means on the periphery of the wheel for receiving the other head.

3. A device for operating windshields or the like comprising a wheel having circumferentially spaced teeth, a transversely bowed and normally straight steel tape having longitudinally spaced openings for engagement with said teeth and having one end adapted for connection with the windshield, a curved wall around a peripheral portion of the wheel for guiding and bending the tape around a portion of the wheel during linear movement of the tape while allowing the ends of the tape to move in paths that leave the wheel periphery, said wall having a circumferential groove in its internal surface for accommodating the teeth projecting through the openings in the tape, an element projecting through the end of the tape opposite the end to be connected to the windshield for limiting windshield opening movement of the tape and having heads on both sides of the latter wherein the head on the outer side of the tape is too large to enter the end of the groove, and means on the periphery of the wheel for receiving the other head and comprising a recess located between a pair of teeth.

4. A device for operating a windshield or the like, comprising a housing having spaced walls, a shaft journaled between said walls and having adjacent axial portions of different diameters thereby providing a shoulder, a wheel on the portion of smaller diameter and resting at one side against said shoulder, and means comprising a portion of the shaft portion of smaller diameter which is swaged over against the opposite side of the wheel for locking the shaft to the wheel.

5. A device for operating a windshield or the like comprising a pair of transversely bowed and contacting tapes, one nesting in the other, means connecting the tapes at one end to the shield, and means for moving the tapes longitudinally, one of the tapes being wider than the other, and normally concealing the narrower tape in an edge view of the assembly.

6. In combination, a windshield or the like, a pair of flexible tapes possessing sufficient linear rigidity to thrust the shield open, means connecting the tapes at one end and to the windshield, the other ends of the tape being free so as to allow them to longitudinally slide one on the other, rotary means having driving connection with one tape for moving the tapes longitudinally, and means for causing portions of the tapes to travel linearly in a curved path.

7. In combination, a pair of superposed tapes, means connecting the tapes at one end only, said tapes having longitudinally spaced and substantially coinciding slots, a sprocket wheel having teeth adapted to project through the slots and to drivingly engage the slots in one tape, the slots in the other tape being slightly longer than the slots engaged by the teeth so as to permit relative sliding of one tape on the other without interfering with such driving engagement, and means for causing the tapes to move in a curved path about a portion of the sprocket wheel when the latter is turned.

8. In a device for operating a windshield or the like, a steel tape for moving the shield, a bracket adapted to be fastened to the shield, a horizontally disposed pin, means pivotally supporting the pin on the bracket for bodily pivotal movement in a horizontal plane, and means on the end of the tape and rotatably embracing the pin to permit the tape to swing in a vertical plane about the axis of the pin.

9. In combination, a pair of superposed tapes having longitudinally spaced and substantially coinciding slots, means connecting the tapes at one end, a sprocket wheel having teeth adapted to project through the slots and to engage the slots in one tape for driving the latter when the wheel is rotated, means for causing the tape to move in a curved path about a portion of the sprocket wheel when the latter turns, and means allowing the tapes to slide linearly with respect to each other without causing interference in the cooperation between the slots in the one tape and the teeth on the sprocket wheel.

ALBERT T. POTTER.